(12) United States Patent
Kaplan (10) Patent No.: US 7,334,802 B2
(45) Date of Patent: Feb. 26, 2008

(54) COMBINATION PORTABLE COOLER AND RETRACTABLE TRAY

(76) Inventor: Ronda Kaplan, 227 SW. Hatteras Ct., Palm City, FL (US) 34990

( * ) Notice: Subject to any disclaimer, the term of this patent is extended or adjusted under 35 U.S.C. 154(b) by 419 days.

(21) Appl. No.: 11/172,136

(22) Filed: Jun. 29, 2005

(65) Prior Publication Data
US 2007/0001409 A1    Jan. 4, 2007

(51) Int. Cl.
*B62B 1/12* (2006.01)
(52) U.S. Cl. ............. 280/47.26; 280/638; 280/35; 280/47.34; 280/47.371; 312/241; 108/14
(58) Field of Classification Search .......... 280/638, 280/639, 35, 655.1, 47.34, 47.371, 47.131, 280/47.17, 47.18, 47.2, 4, 47.26; 312/241; 108/14, 33
See application file for complete search history.

(56) References Cited

U.S. PATENT DOCUMENTS

| | | | | |
|---|---|---|---|---|
| 3,522,955 | A | | 8/1970 | Warner, Jr. |
| 4,436,353 | A | * | 3/1984 | Tucker ................... 312/241 |
| 4,581,902 | A | * | 4/1986 | Starck et al. ............ 62/258 |
| D368,387 | S | | 4/1996 | Bureau |
| 5,833,333 | A | | 11/1998 | Brown |
| 5,860,281 | A | | 1/1999 | Coffee et al. |
| 5,947,032 | A | | 9/1999 | Meier |
| 6,053,587 | A | * | 4/2000 | Boerder .............. 312/249.12 |
| 6,328,179 | B1 | | 12/2001 | Conrado et al. |
| 6,364,329 | B1 | * | 4/2002 | Holub et al. ........... 280/47.26 |
| 7,111,852 | B2 | * | 9/2006 | Woods et al. .......... 280/47.34 |
| 2001/0030403 | A1 | * | 10/2001 | Johnson et al. ........ 280/47.26 |
| 2006/0065665 | A1 | * | 3/2006 | Swartfager et al. ..... 220/592.2 |

* cited by examiner

*Primary Examiner*—Christopher P. Ellis
*Assistant Examiner*—John D Walters
(74) *Attorney, Agent, or Firm*—McHale & Slavin, P.A.

(57) ABSTRACT

The present invention is directed towards a portable, insulated container with lid; particularly towards a portable insulated container with lid and attached tray for movement between a stowed and elevated position above the surface of the container lid capable of supporting various items thereon while simultaneously allowing the user to lift the lid of the container to access the interior; more particularly to a portable cooler with an attached retractable tray constructed and arranged to be readily positioned by a single user at various elevations above the surface of the lid.

16 Claims, 11 Drawing Sheets

COMBINATION PORTABLE COOLER AND RETRACTABLE TRAY

FIELD OF THE INVENTION

The present invention is directed towards a portable, insulated container with lid; particularly towards a portable insulated container with lid and attached tray for movement between a stowed and elevated position above the surface of the container lid capable of supporting various items thereon while simultaneously allowing the user to lift the container lid to access the container's interior; more particularly to a portable cooler with an attached retractable tray constructed and arranged to be readily positioned by a single user at various elevations above the surface of the lid.

BACKGROUND OF THE INVENTION

Portable, insulated containers, (also known as ice chests, coolers, etc.), are commonly used when electrical or gas powered refrigeration, or warming means, are not convenient or available, for example, remote locations such as the beach, ball games, boating, and the like.

Recently, the portability of insulated containers has been enhanced, as many are currently constructed with at least one wheel located proximate the bottom surface and at least one handle for pulling or pushing the containers along. Frequently, consumers use the lid of the insulated containers as a surface (i.e. picnic table) upon which to place food, drinks, or other items. However, this can be onerous, as all of the items on the lid must be moved when access to interior of the container is desired. Moreover, it is often burdensome to transport a separate table to remote locations for this purpose.

It has been proposed to provide an insulated container comprising a hollow cavity for portable storage of an unattached table that is removed from the cavity and attached to one or more of the sides of the container when needed. However, problems often arise with the stability of the table. In addition, a detached table/lid may become misplaced or lost potentially rendering the assembly inoperable.

It is also known for insulated containers to include a table that is removably or pivotally attached to the container lid, such that the items within the container can be readily accessed without having to first clear all objects off the lid. However, this table/lid configuration tends to make the lid heavy, thus, potentially difficult for one person to lift and/or pivot.

In addition, containers with removable or pivotal tables create a larger "footprint", which can become an obstacle especially when available floor space is limited, such as on a boat, RV, and the like. Thus, what is needed is a container that can provide a stable table configuration capable of being deployed by a single individual to various heights above the container as desired, while utilizing less living space. It can be advantageous to provide a variable height table so that the table surface can be adjusted to a comfortable level, whether users are standing or sitting in proximity to the table.

DESCRIPTION OF THE PRIOR ART

While there are numerous commercially available containers with table assemblies designed for transport and accessibility of items within the container, many of these designs found in the prior art make no attempt to provide an insulated storage container with an attached, deployable table that when in a position of use will allow a single user to both readily access the interior of the container and position the table at various heights above the upper surface of the container.

For example, U.S. Pat. No. 4,581,902 to Starck et al., disclose a portable cooler and auxiliary table. The cooler includes an insulated container having a lid to provide access to the cooler's interior. In one embodiment, an auxiliary table is provided with U-shaped brackets at opposite ends that are securable in receivers at the opposite ends of the container to fasten the top in a position immediately overlying the cooler cover for storage.

In another embodiment of Starck et al., support legs are pivotally attached to the ends of the cooler between the storage position and a position of use. When in use these legs are securable in receivers at the opposite ends of the table. In yet another embodiment of Starck et al., in which the table includes rods which are extendible from apertures in the cooler side or end walls and can be elevated to the desired position and then secured in place above the container.

Unlike the instant invention, all the aforementioned embodiments of Starck et al., preclude access to the interior of the container until the table is in the elevated position. Additionally upon closer inspection of the disclosed embodiments of Starck et al., one of ordinary skill in the art will realize that in order to elevate the table at least one person must be positioned at each side of the container working in concert to release the table support means (e.g. detent pins, support rods or support legs), while moving the tray up or down along the support legs. Furthermore, all of the embodiments of Starck et al., fail to include a means to prevent lateral movement of the table when in a position of use, thus, the auxiliary tables either wobble or become completely detached from their support means if accidentally hit.

U.S. Pat. No. 6,328,179 to Contrado et al., disclose an improved portable cooler that includes a cooler body provided with wheels and a pivoted towing handle with two grips to allow use of the cooler by persons of both tall and short stature. The cooler cover is provided with a recess and a closure panel for storage of items within the cooler above melting ice or relatively heavy items that might crush items contained in the cooler. A table assembly is operable independent of the lid allowing the table to be supported on independent legs with the cooler lid in a closed position, as well as to allow access to the interior cavity of the cooler without clearing the table.

U.S. Pat. No. 5,947,032 to Meier discloses a portable cooler that includes an open-topped container having a cover, wherein the cover defines a hollow cavity therein for removably receiving and holding a table within the cavity. The table is provided with folding legs at one end, and the other table end is received and supported by either one of two handles of the cooler.

U.S. Pat. No. 5,833,333 to Brown et al., disclose a combination box and stool for providing a container with a lid that may be used as a stool and support stand. The device includes a bottom container with front, back, and sidewalls upwardly extending from a bottom wall to define a hollow interior. When the invention is in an assembled condition a top lid rests on the bottom container top edge to cover the bottom container interior. The top lid has a pair of spaced apart legs downwardly extending from the top lid lower surface. When in the assembled condition, each leg is inserted into a respective leg slot. A locking means is included for locking the top lid to the bottom container when positioned in the assembled condition. When the top lid and the bottom container are not in the assembled condition, the legs are rested on a surface and the bottom container bottom wall is rested on the top lid upper surface.

U.S. Pat. No. 4,436,353 to Tucker, discloses a portable storage device and table for outdoors activity that unfolds from a trunk-like container into a table. The device has a front shelf face, which foldably lifts from the container to provide support for the table surface, and the trunk-like base provides a storage receptacle.

U.S. Pat. No. D368,387 to Bureau, discloses an ornamental design for a combined cooler and collapsible table. According to the disclosure set forth in the drawings, a cooler is provided with rotatable U-shaped leg members which fit around the cooler adjacent the lid in a closed position, and extend under the cooler in an open position to provide legs which elevate the top of the cooler to table height. The lid has leaves to provide a wider table surface.

While the foregoing described prior art devices have advanced the art in a variety of ways, there nevertheless remains a need for a insulated container comprising a stable tray/table configuration that can be deployed by a single individual to various heights above the container as desired, while utilizing less living space.

SUMMARY OF THE INVENTION

The instant invention is drawn to a portable, storage container having two opposing insulating sidewall panels and two opposing insulating end panels extending between the sidewall panels. Each of the end panels and sidewall panels are attached to a bottom panel, thereby defining an insulated internal cavity with an upper access opening. The interior cavity is constructed and arranged for receipt of at least one item therein and an insulating cover member is placed over the access opening when in a "closed" position, and substantially removed from the access opening when in an "open" position.

The container includes a pair of handle members comprising at least one leg portion and a transverse portion attached to the leg portion. The leg portion of each handle member is pivotally attached to the container at one end and includes at least one integrally formed attachment means at the opposite end. The handle members are movably attached between a first position that permits user to grip the handles for transporting, and a second position wherein the attachment means on the handle members removably attaches to the tray, so that the tray is supported in a generally horizontal position above the access opening of the container.

The tray member is attached to at least one of the insulated container sidewalls and translates between a "stowed" position in which the tray member is generally lower than the access opening of the container, and a "deployed" position where the upper surface of the tray member faces upwards and the tray edge removably engages the handle attachment means.

The tray member is stabilized along three sides of the table plane, thereby preventing the tray from collapsing if inadvertently bumped. Furthermore, the cover member can be opened and closed independent of the location of the tray member, thereby allowing unhindered access to the container contents.

While the use of insulated container and table assemblies, and the like are known, prior to the instantly disclosed invention there was no adequate means in the art by which a single user could effectively convert a container into a stable table and back, as desired.

Accordingly, it is the principle objective of this invention to provide a convenient and simple means to convert a portable, insulated container assembly into a functional table while simultaneously providing unhindered access to the contents inside the container. Thus, tile aforementioned problems of structural instability and inhibited access to the container contents are substantially reduced.

It is a further object of this invention to provide an insulated container and table assembly capable of being assembled by hand without the need for tools, equipment, special skill or additional persons.

It is a further object of this invention to disclose a container and table assembly that is easily set-up and stowed for ease in transporting and efficient storage.

Still another objection of this invention is to disclose an assembly that requires no use of tools, thereby requiring little skill by the user.

Another objective of the instant invention is to provide an assembly that is economical to manufacture in that it has few components.

Yet an additional objective of the instant invention is to provide an assembly with a small footprint that utilizes the least amount of living space as possible. This is particularly advantageous when space is limited, such as on a boat, RV, and the like.

Still another objective of the present invention is to provide an assembly that can provide a stable tray configuration capable of being deployed by a single individual to various heights above the container as desired, while providing lateral stability.

Other objectives and advantages of this invention will become apparent from the accompanying descriptions taken in conjunction with the accompanying drawings wherein are set forth, by way of illustration and example, certain embodiments of this invention. The drawings constitute a part of this specification and include exemplary embodiments of the present invention and illustrate various objects and features thereof. It will be readily appreciated by those skilled in the art that the use of multi-functional, insulated, portable container is highly effective in maximizing living space and useful in the container art.

DEFINITIONS

The following list defines terms and phrases used throughout the instant specification. Although the terms and phrases are listed in the singular tense the definitions are intended to encompass all grammatical forms.

The terms "tray" and "table" are used interchangeably herein and refer to any surface upon which items can be placed.

The terms "cover" and "lid" are used interchangeably herein and refer to any means which substantially covers the access opening of the container when in a closed position, and in an open position provides access to the interior of the container.

DETAILED DESCRIPTION OF PREFERRED EMBODIMENTS

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
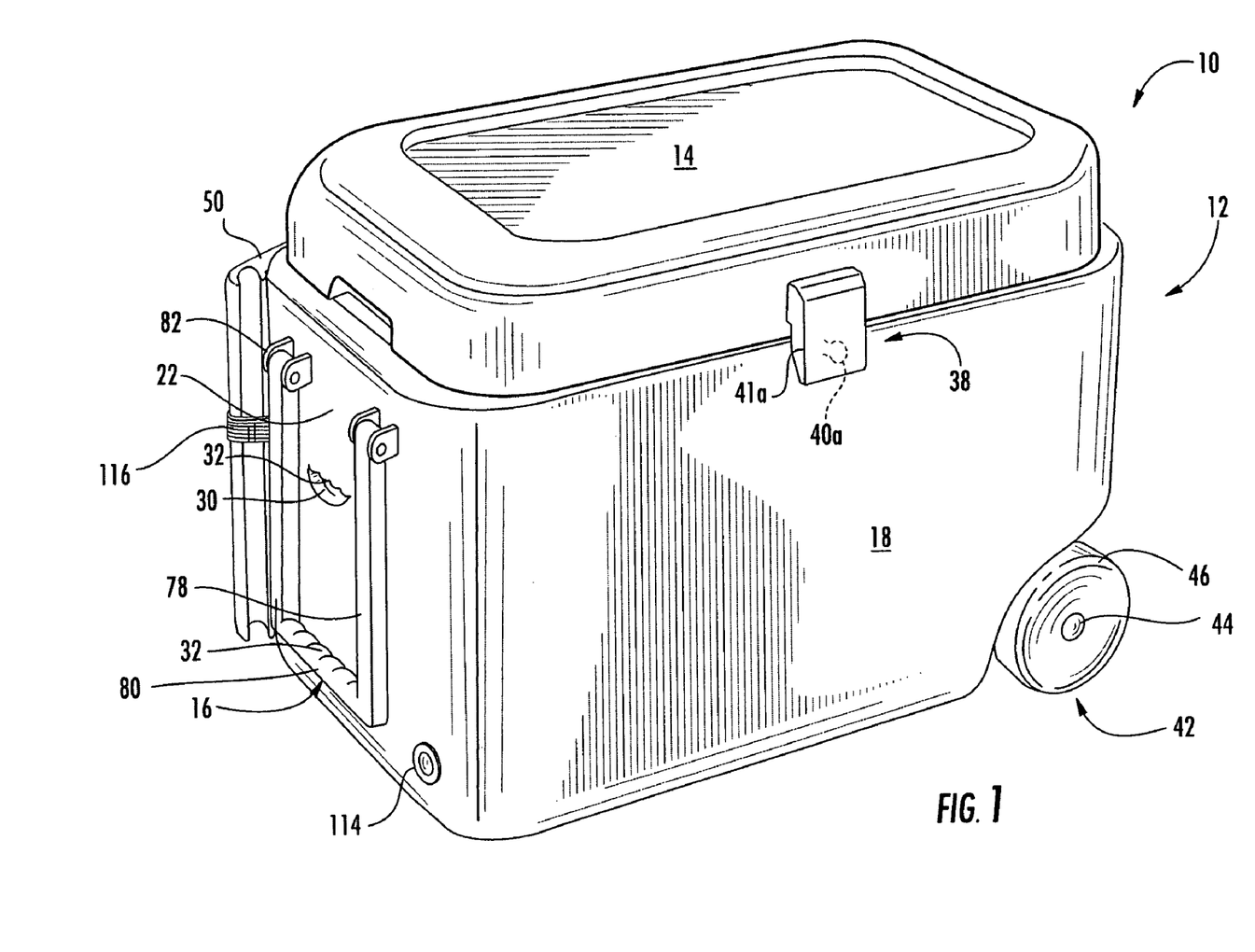
FIG. 1 illustrates an upper perspective view of one embodiment the instant assembly.

Referring now to FIGS. 1-9, wherein like elements are numbered consistently throughout, FIG. 1 shows an upper perspective view of one embodiment the instant container assembly, generally referenced as 10. By way of an overview, the assembly 10 comprises an insulated container 12, and a pair of pivotally attached handles 16 (only one of which is shown). An insulating lid 14 is shown positioned over the container access opening.

Specifically, as shown in FIG. 1, the insulated container 12 can include two opposing insulated sidewall panels 18, 20 and two opposing insulated end panels 22, 24 that extend between sidewall panels 18, 20. Each of the panels 18, 20, 22, 24 are attached to an insulated bottom panel 26, thereby defining an internal cavity with an upper access opening 28, best seen in FIG. 4E and FIG. 6. The interior cavity is constructed and arranged for receipt of at least one item therein, (e.g. food, drinks, ice, etc.) and can include compartments, recesses, pockets or other means of compartmentalizing and dividing the interior cavity as well known in the art. In addition, the container can include a drain port 114 to empty any unwanted fluid as well known in the insulated container art.

Figure 2:
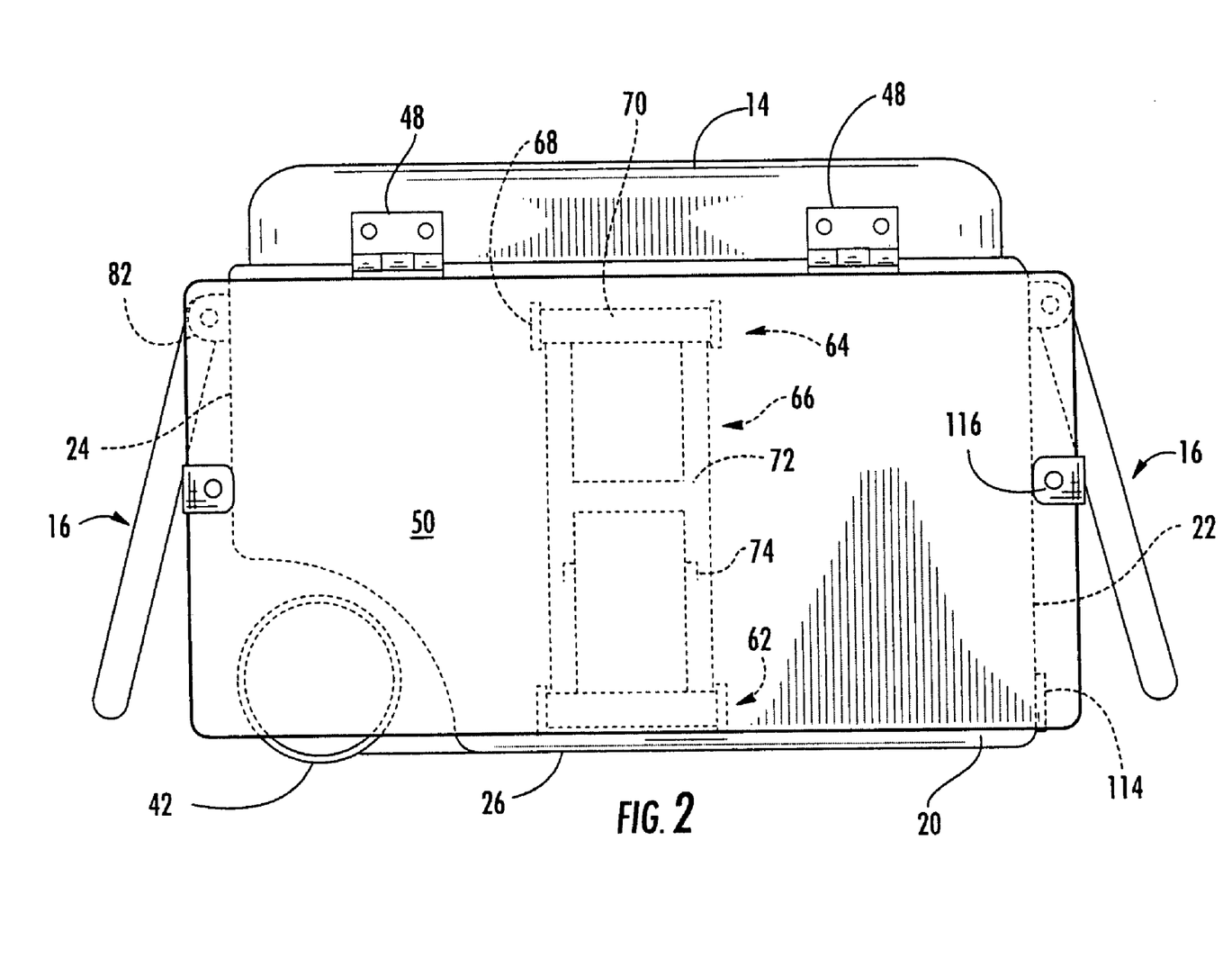
FIG. 2 is back view of the embodiment of FIG. 1, depicting the tray in a stowed position along one sidewall of the container.

FIG. 2 illustrates a back view of the embodiment shown in FIG. 1 wherein the lid 14 is attached to the sidewall of the container by at least one pivot means shown here as, (albeit not limited to) hinges 48, however, pins, axles or any other functionally equivalent structure known in the art can be used to connect the lid to the container. Moreover, it is contemplated herein that the lid 14 could be pivotally attached to the endwall without departing from the scope of the invention.

As best seen in FIG. 1, the endwall or sidewalls may also include at least one integrally formed gripping means 30 (only one of which is illustrated) into which the user may insert their hand when horizontally lifting the container into and out of a trunk of car or the like.

Preferably, the container panels and lid comprise an outer shell formed from a light-weight, high strength material such as, albeit not limited to polypropylene, polyethylene or the like, with the interior of the shell filled with any insulating material known to those skilled in the art, e.g. polyethylene or polyurethane foam.

The assembly 10 includes at least a pair of handles 16 pivotally connected to opposing sides of the container by a pivot means (e.g. hinge, pins, axles or any other functionally equivalent structure known in the art). The handles can be individually rotated about the pivot means between a "first" position wherein the handle leg 78 and transverse portion 80 are located juxtaposed, or proximate, opposing sides of the container for easy storage (FIG. 1) or extended for pulling the container along by the user via a wheel assembly 42, and a "second" position wherein at least a portion of the handle, preferably the transverse portion 80, is releasably connected to a portion of a tray 50 in its deployed position as discussed in detail below with respect to FIGS. 3 and 3a.

Figure 5:
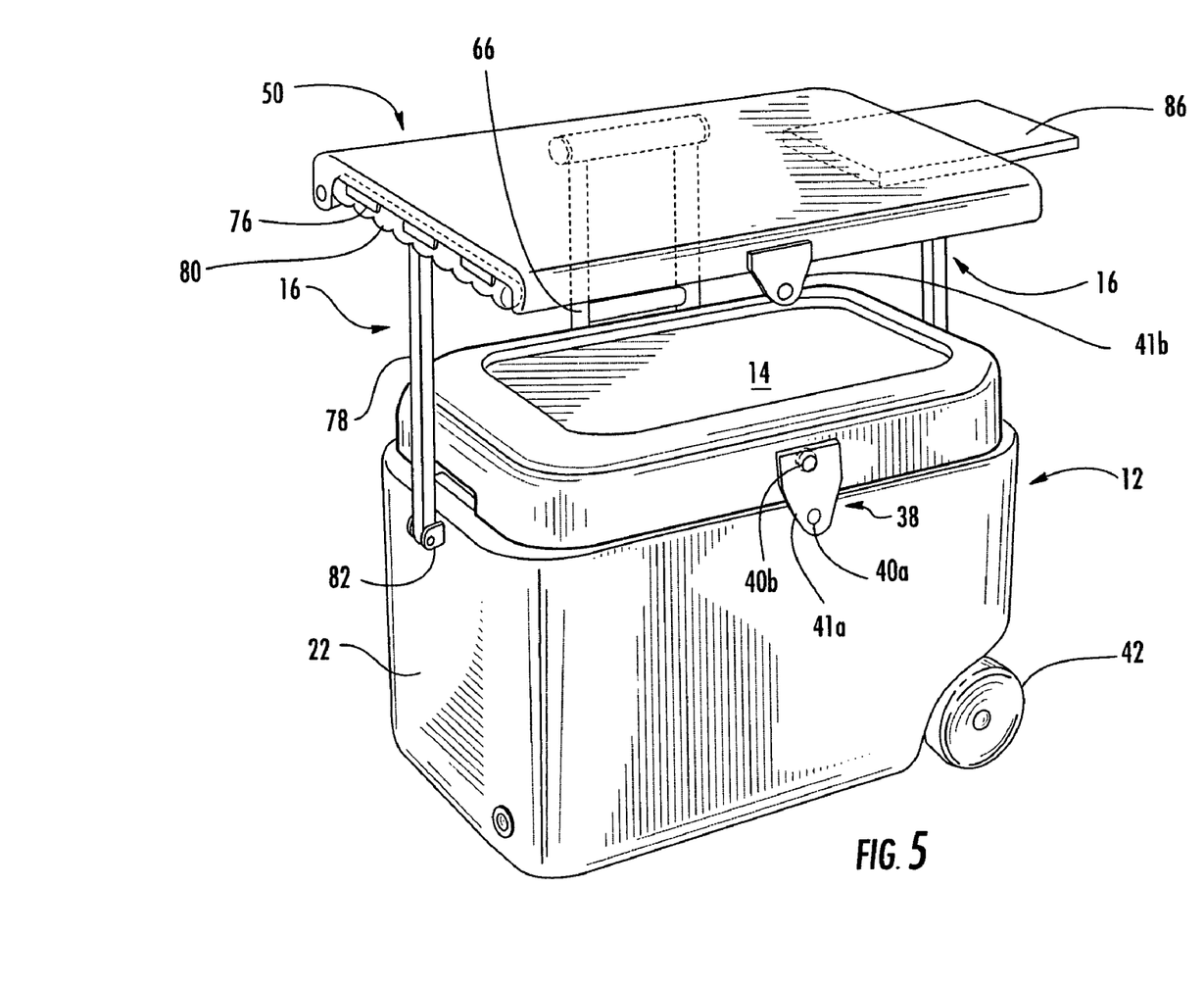
FIG. 5 illustrates an upper perspective view of an alternative embodiment of the instant assembly with tray in a deployed position and a handle having a single transverse portion.
Figure 6:
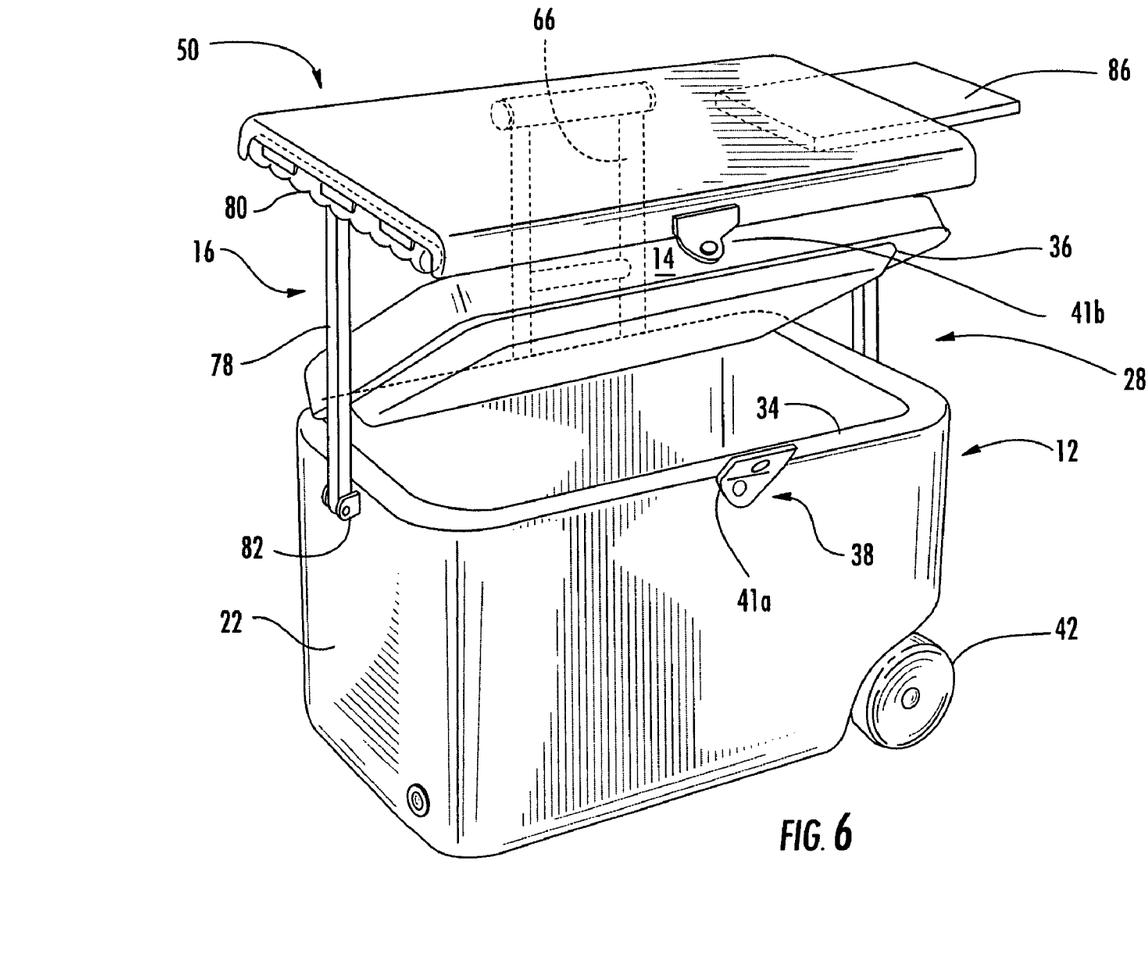
FIG. 6 illustrates an upper perspective view of the embodiment FIG. 5 with the container lid in an open position.

Preferably the handles 16 include a pair of legs, however, the handle assembly include one leg 78 and one transverse portion 80, as shown in the embodiment of FIGS. 5, 6. In addition, the handles 16 are preferably formed of a substantially rigid material, (e.g. plastic, wood, metal or combinations thereof), and may include any ergonomic element known in the art to aid in handling, such as finger indentions 32 or the like.

As seen in FIG. 1, one side of the container proximate the junction of the end panels and the bottom panel comprises a wheel assembly 42 (only one wheel is shown) for rotation about a generally horizontal axle 44 to allow the user to readily pull (or push) a container along by one of the handles 16 when the handles are in their first position. It is contemplated herein that a similar wheel assembly could be attached to the opposite side of the container.

As shown in FIG. 6, the lid 14 may include a seal 36 integrally formed along the underside, peripheral edge thereof for providing a seal with the upper edge 34 of the container 12. Conversely, the seal 36 can be integrally formed along the upper edge of the container. In addition, the peripheral edge the lid 14 may include at least one gripping means, (i.e. recess, not shown) allowing the user to grasp the lid by its edge for easier opening.

The embodiment of FIG. 1 illustrates the peripheral edge of the container 12 may further include at least one fastening assembly 38 comprising a female receiving means 41*a* for releasable attachment to a corresponding male element 40*a* integrally formed proximate the upper edge of the lid 14. Examples of male attachment means include a projection, detent, snap, lug or the like. Conversely, it is contemplated herein the female receiving means 41*a* attached to the lid 14 and a corresponding male element 40*a* integrally formed on the container for receipt within the female receiving means 41*a* thereby securing the lid 14.

Referring to FIG. 2, the back of the assembly 10 shown in FIG. 1 is illustrated. The assembly shows the tray member 50 in a "stowed" position, that is, the tray member 50 is generally lower than said upper access opening of the container 12 and substantially parallel to the plane of the sidewall panels.

Figures 3, 3A:
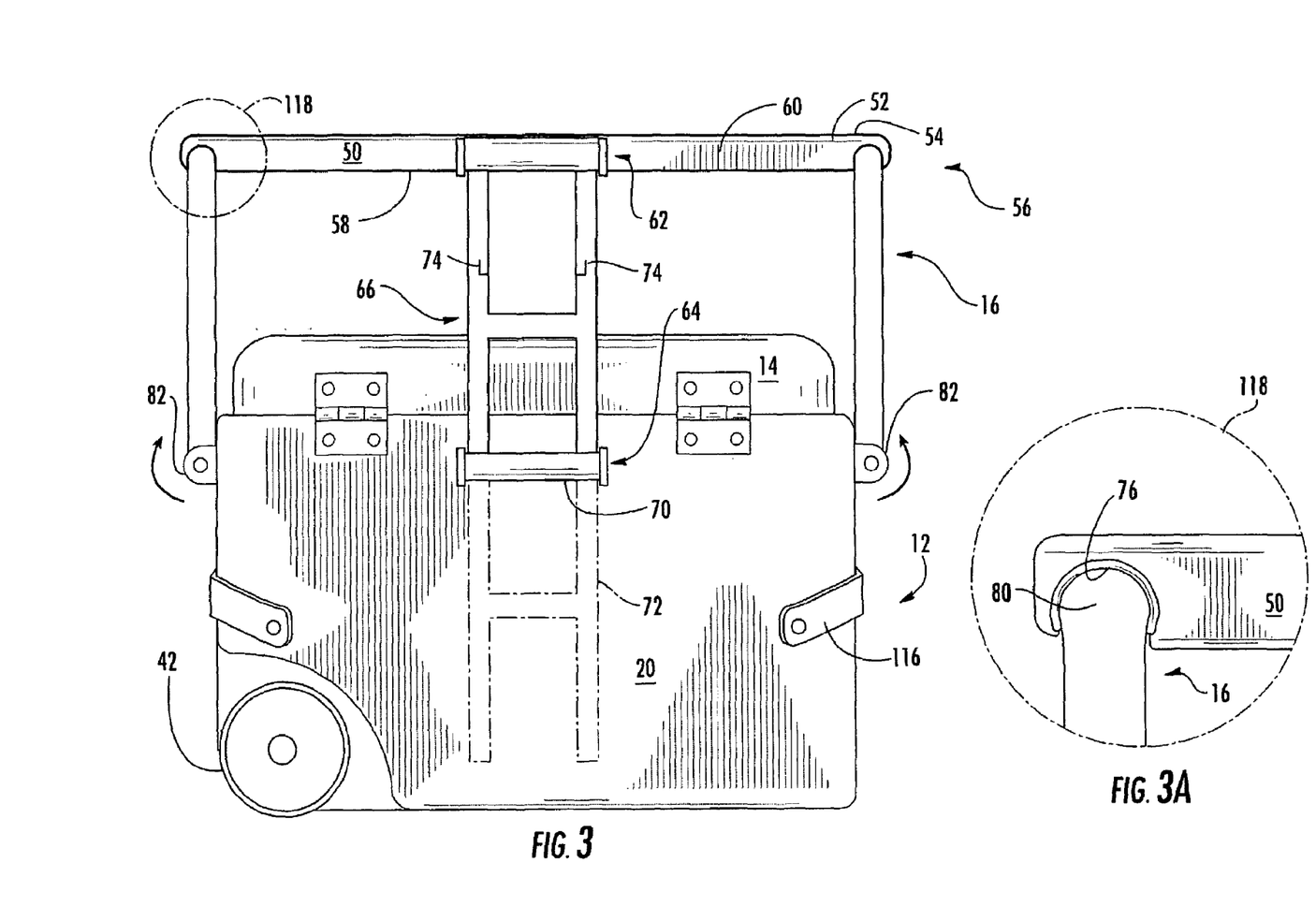
FIG. 3 is back view of the embodiment of FIG. 1, depicting the tray in a deployed position.
FIG. 3A is an enlarged partial detail of the handle retaining means, shown in FIG. 3.
Figures 4A, 4B, 4C:
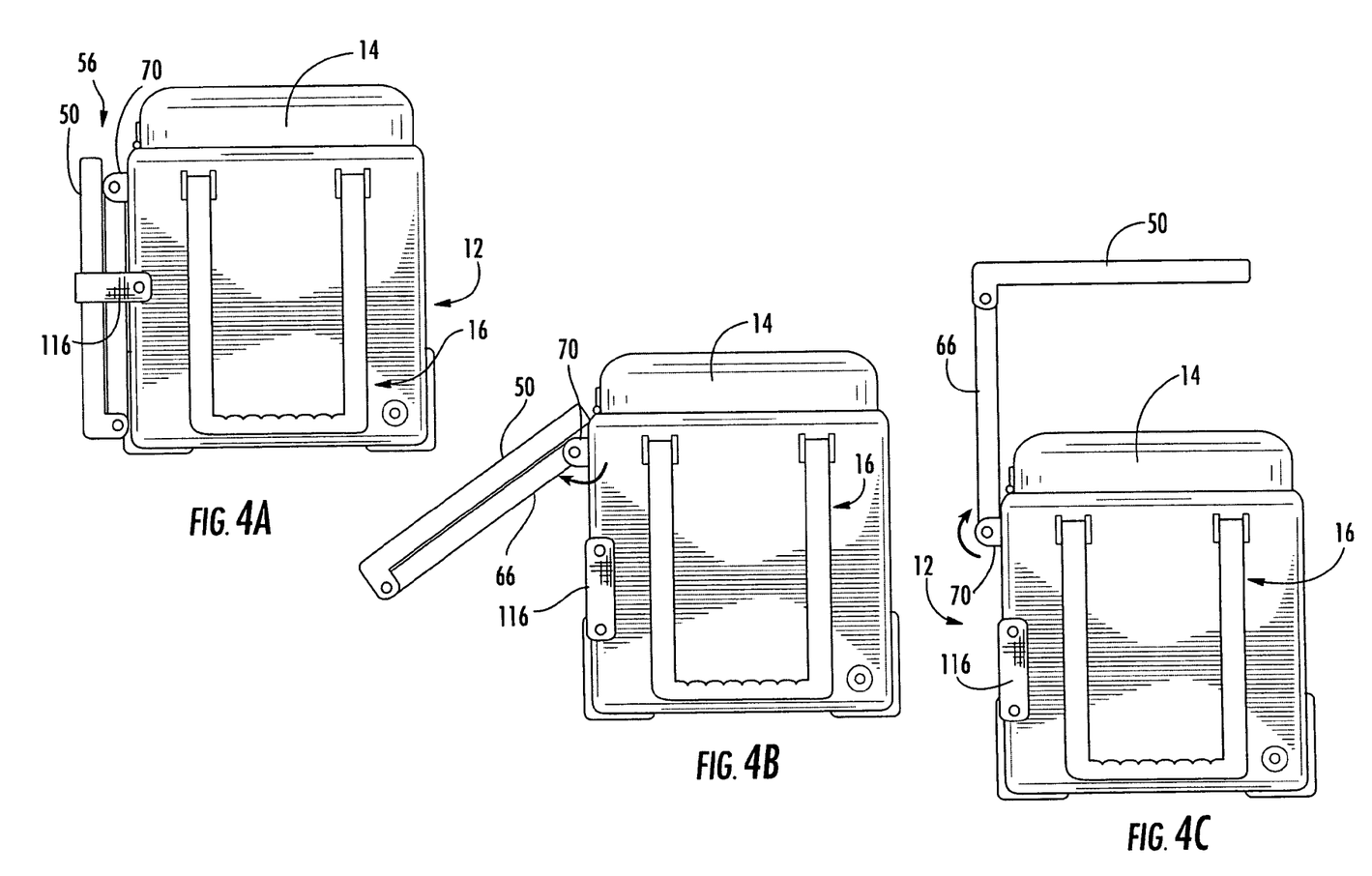
FIG. 4A is a side view of one embodiment of the container assembly as seen along the container endwall, illustrating the support assembly in a stowed position.
FIG. 4B is a side view of container as shown in FIG. 4A, illustrating the support assembly in a partially deployed position.
FIG. 4C is a side view of the container as shown in FIGS. 4A and 4B, illustrating the support assembly in the a deployed position.
Figure 4D:
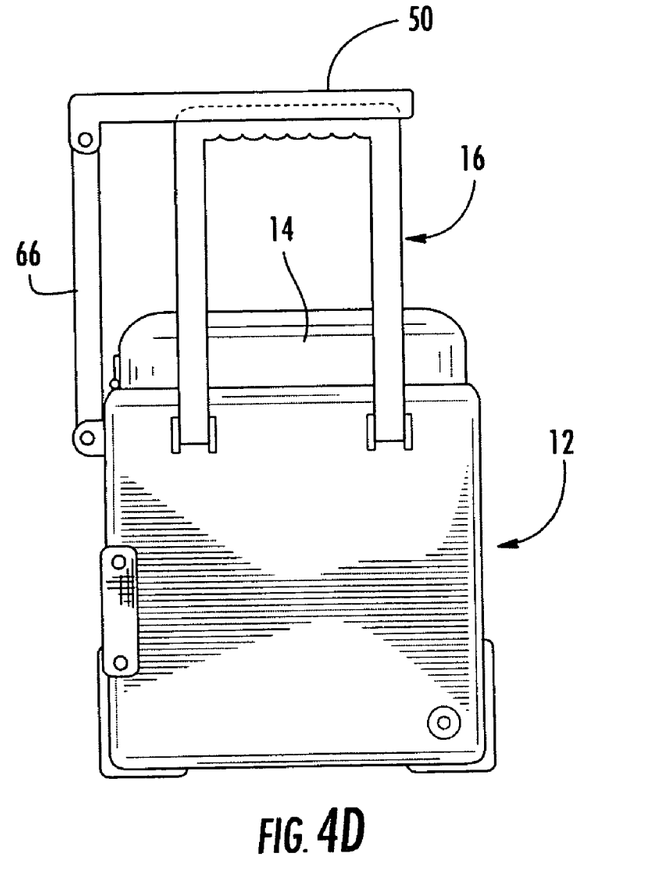
FIG. 4D is a side view of the container seen FIG. 4A, illustrating the support assembly in a deployed position with the handle members received in their corresponding receiving means.
Figure 4E:
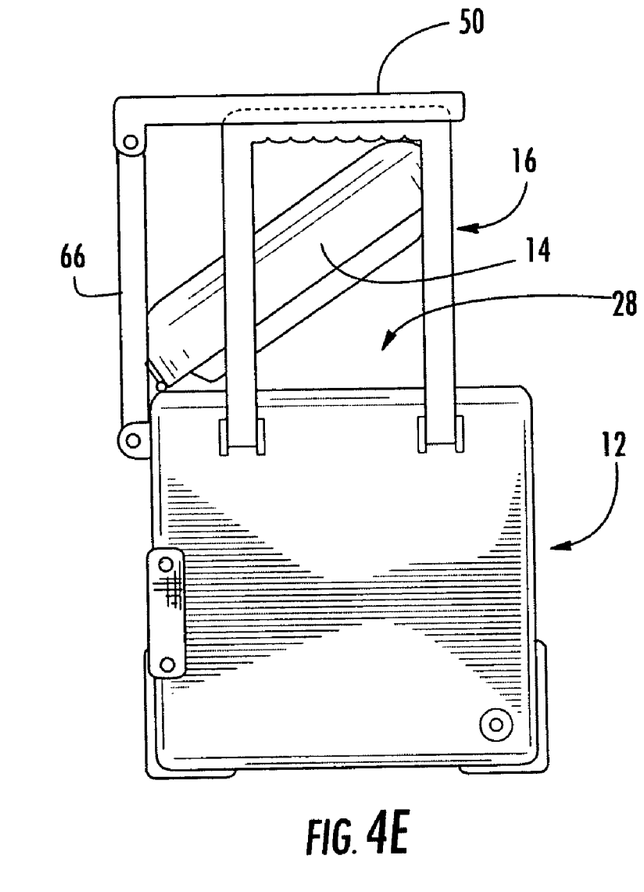
FIG. 4E is a side view, illustrating the assembly of FIG. 4D with lid in the open position for unobstructed access to the interior of the container.

The tray member 50 is actuated between the "stowed" and a "deployed" position. As can be seen in FIG. 3, when the tray member 50 is in the deployed position, the upper surface 52 of the tray is provided in a generally elevated, horizontal position above the access surface of the container or lid such that the user is able to readily access the interior of the container. The tray member 50 translates by way of a support assembly 56 that is operatively coupled to either the end, or sidewalls of the container and creates a laterally stable foundation above the container when coupled with the handles 16.

The tray member 50 is generally a planer sheet, although depicted herein as generally rectangular, other shapes (e.g. circular, square, oval, etc.) may be used while remaining within the scope of the instant invention. In a particularly preferred embodiment, the tray member 50 is provided with a sidewall 60 having thickness of approximately ¼ inches, although not limited thereto. The tray 50 may be formed from a variety of materials, including, plastic, wood, metal, or suitable combination thereof. It is contemplated that alternative embodiments of the tray member could include hinged configurations that would allow the tray member 50 to be folded or collapsed into a smaller, more portable form (not shown).

The tray member upper surface 52 is constructed and arranged to provide an area on which various items may be placed, e.g. food, drinks and the like. The tray member upper surface 52 may include a plurality of integrally formed recesses (not shown) at any location thereon configured to hold various sized items. For example, the surface 52 may include drink holder recesses adapted to hold various sized glasses, or cans, in a substantially vertical position. Additionally, the upper surface 52 may include a lip 54 (FIG. 3) designed to assist in retaining any items on the upper surface of the table should they roll easily or fall over.

In a preferred embodiment, shown in FIGS. 1-4E, the support assembly 56 includes a rigid member 66 operatively connected to the tray member 50 along both lower surface 58 and sidewall 60 of the tray by a pivot means 68 at the first end 62. The second end 64 of the rigid member 66 is operatively connected to either the sidewall 20 or endwall (not shown) of the container by a pivot means 70 at a second end 64. It has been discovered that this particular configuration lends both adequate clearance for the user to access the interior of the container 12, while providing structural integrity to the table member 50. However, as would be obvious to the skilled artisan, the rigid member 66 can comprise a plurality of rigid members connected to one of the sides of the container 12 and the tray 50 without departing from the scope of the invention.

As depicted in FIGS. 2, 4A-E, in order to securely place the rigid member 66 in the stowed position the container sidewall or endwall panels can include excess material comprising at least one rib 72 which is constructed and arranged to engage corresponding c-shaped clips 74 integrally connected to the rigid member 66, so as to releasably secure the tray member 50 to the container 12. Although, depicted herein as c-shaped clips and ribs, it is contemplated other means of releasable attachment could be used, e.g. protuberances, formed on either the container 12 or rigid member 66 which engage, e.g. snap into, corresponding openings in either the container 12 or rigid member 66. Although not shown, it is contemplated that the sidewall or endwall panels could include a recess formed therein having a configuration of the rigid member, the recess including at least one releasable attachment means therein, so that when placed in the stowed position, the rigid member is substantially flush with the container sidewall or endwall panels.

In addition, as shown in FIG. 2, the tray member 50 can be permanently secured to either or both of the container sidewalls by any means for securing, e.g. straps 116, clips, or structural equivalent known in the art.

As shown in the detail 118 of FIG. 3A, the tray sidewalls can include at least one retaining means 76 for releasably connecting to the transverse portion 80 of the handle 16 (FIG. 3*a*). The retaining means 76 are shown herein as c-shaped clips constructed and arranged to releasably engages the outer surface of the handle 16, such that, when the tray member 50 is placed in the deployed position, the user pivots the handles 16 into the c-shaped clips as shown in FIGS. 4A-E. It is contemplated that the retaining means 76 could include at least one cutout integrally formed to the tray member 50 which is constructed and arranged to receive the leg portion 78 of the handle 16. Although, depicted herein as c-clips, it is contemplated other means of releasable attachment could be used, e.g. straps, protuberances, formed on either the handle 16 or tray sidewall engage or snap into corresponding openings in either the handle or tray sidewall.

FIGS. 5 and 6 depict an alternative embodiment wherein the handle members 16 include only one leg portion 78 with one transverse portion 80 for engaging and retaining the deployed tray member 50 at a given height above the access opening of the container. The support assembly 62 comprises a plurality of spaced apart rigid members 66 attached to the container sidewall. As with the previous embodiment, access to the interior of the container is unhindered when the tray member 16 is in the deployed position, as shown in FIG. 6. This particular configuration is advantageous, as it requires less material and therefore more economical to manufacture.

Should the user desire the lid 14 be held in the "open" position for easy access to the interior of the container, as shown in FIGS. 5 and 6, the fastening assembly 38 can further include a second female receiving means 41*b*, which is substantially identical to the first female receiving means 41a on the container. The second female receiving means 41 is connected to the tray member 50 for releasable attachment a corresponding the male element 40 (e.g. projection, detent, snap, lug or the like) integrally formed proximate the upper edge of the lid 14. Thus, when the lid 14 is unfastened from first female receiving means 41a on the container 14 the lid may be pivoted until it is matingly received with the second female receiving means 41b on the tray member 50, such that the lid 14 remains in the open position for ready access, as shown in FIG. 6.

In addition, the tray member 50 could include at least one auxiliary table or tray 86 that can be deployed from a hollow within the interior of the tray member, as shown in FIG. 6 or pivotally attached to the upper or lower surfaces 52, 58 of the tray member 50.

Figure 7A:
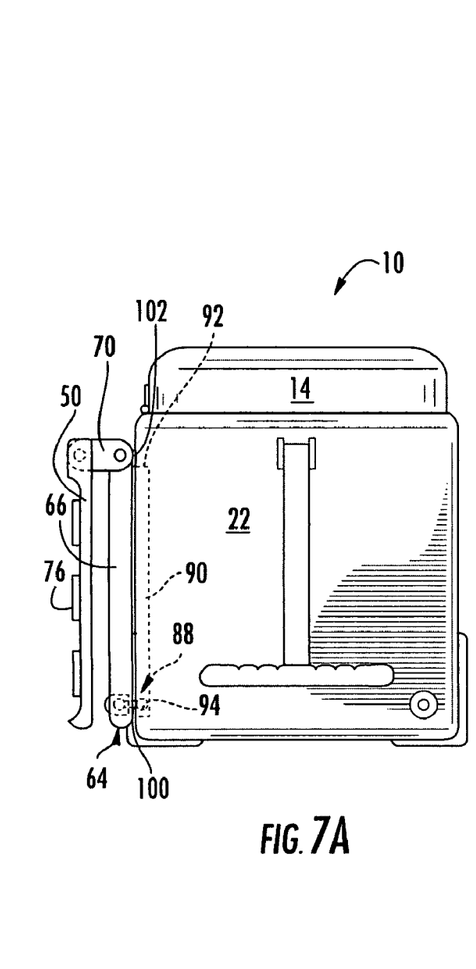
FIG. 7A is a cross-sectional view of an alternative embodiment of the container assembly as seen along the container endwall, illustrating the support assembly in a stowed position.
Figure 7B:
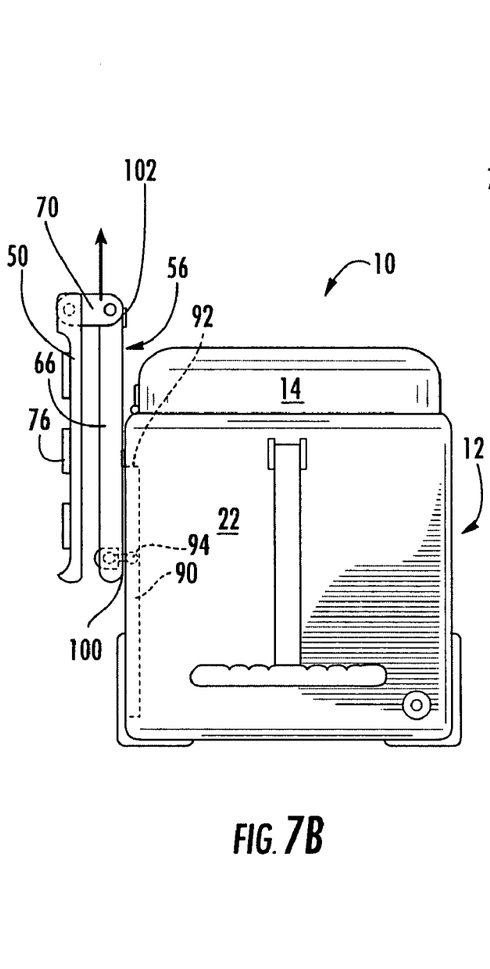
FIG. 7B is a cross-sectional view of the embodiment of FIG. 7A, illustrating the support assembly in a partially deployed position.
Figure 7C:
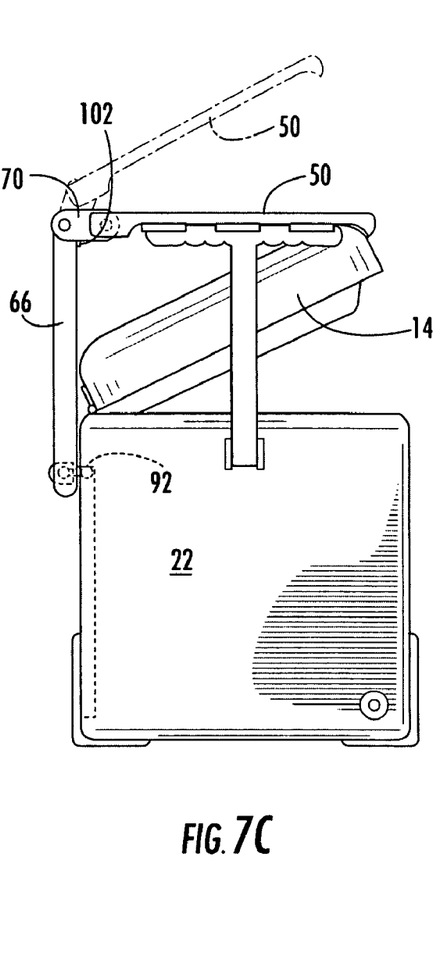
FIG. 7C a cross-sectional view of the embodiment of FIG. 7A, illustrating the support assembly in a deployed position.

FIGS. 7A-C illustrates a cross-sectional view of another embodiment of the instant assembly 10 as seen along the endwall 22 of the container 12. In this embodiment, the support assembly 56 may be sliding translated between the stowed position (FIG. 7A) and the deployed position (FIG. 7C). This embodiment is advantageous as it does not require much clearance to deploy the tray member 50.

In this embodiment the container sidewall 20 includes a groove 90 that extends from proximate the bottom panel 26 to just short of the upper edge of the container 34, thereby forming a stop 92 in which at least one pin assembly 88, connected to the ridged member 66, is slidably retained therein.

Figure 8A:
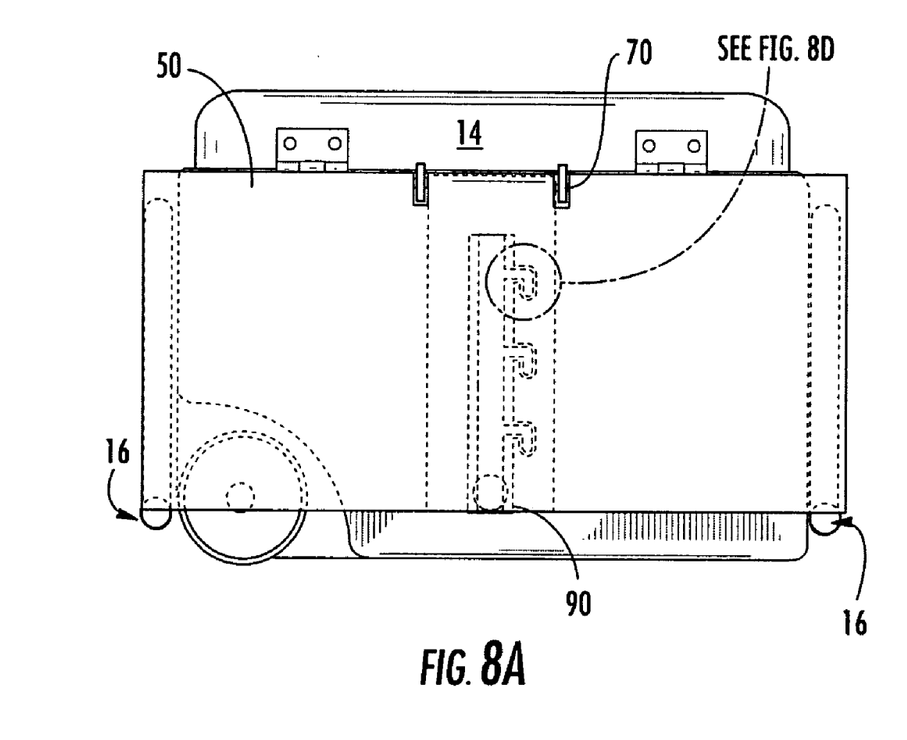
FIG. 8A is a cross-sectional view of the container assembly of FIGS. 7A-C, as seen along the container back sidewall, illustrating the support assembly in a stowed position.
Figure 8B:
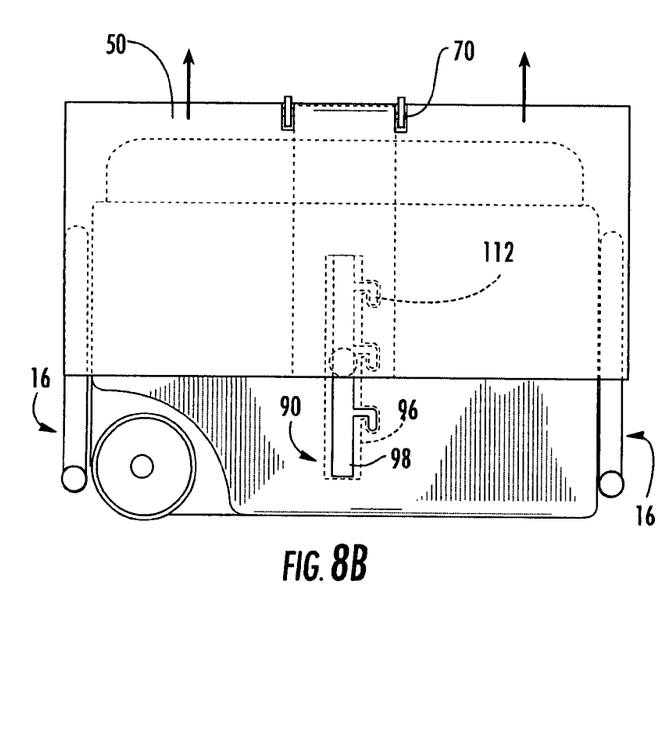
FIG. 8B is a cross-sectional view of the container assembly of FIGS. 7A-C, as seen along the container back sidewall, illustrating the support assembly in the partially deployed position.
Figure 8C:
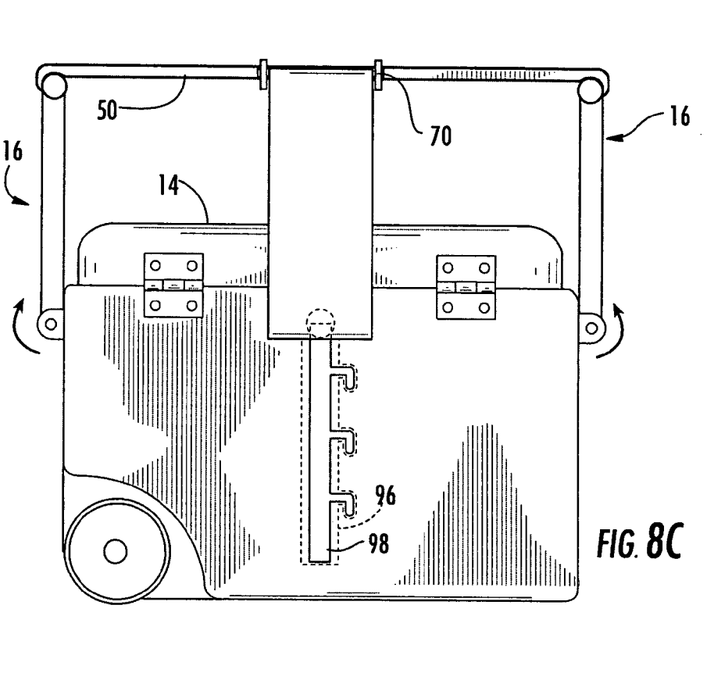
FIG. 8C is a cross-sectional view of the container assembly of FIGS. 7A-C, as seen along the container back sidewall, illustrating the support assembly in the completely deployed position with the handle members being pivoted to engage the tray member.

As shown in FIGS. 8A-C, which illustrates the embodiment of FIGS. 7A-C as seen along the sidewall 22, the groove 90 includes a inner wider portion 96 and a narrower lip 98. The pin assembly 88 includes a head portion 94 that is constructed and arranged for receipt within the wider portion 96 of the groove 90 and a shaft portion 100, which is slidably received in the outer lip 98. Put another way, the length dimension of the head 94 is larger than the width of lip 98 formed within the container sidewall.

The pin 88 is preferably attached to the rigid member 66 of the support assembly 56 at the second end 64 by any means of attachment known in the art, such as, adhesives, welding, rivets, clamps, nut and bolt, screws, etc. This way the user is able to grasp the tray member 50 or support assembly 56 such that the at least one pin 94 slides vertically within the sidewall of the container until it reaches the stop 92, at which point the user is able to pivot the tray member 50 about the pivot means 70, as shown in FIGS. 7c and 8c.

Figure 8D:
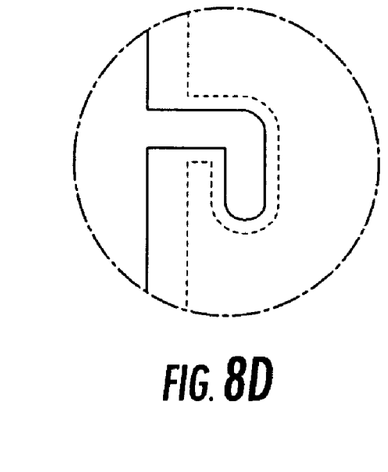
FIG. 8D is an exploded view of the channel depicted in FIG. 8A.

In addition, as shown in FIGS. 8a-c, the groove 90 can include at least one horizontally disposed locking channel 112 at various heights which connect to groove 90 such that as the pin head 94 is moved upward within the groove 90, the user can slide the head 94 horizontally within these channels 112 once desired height of the rigid member 66 and the attached tray member 50 is reached, see FIG. 8D.

As best depicted in FIGS. 7A-C, the rigid member 66 can optionally include at least one integrally formed bracket 102 at the first end 62 that acts as a stop to hold the tray member 50 in a generally a horizontal position until the user can position and engage the handles 16 into the tray member 50.

Figure 9:
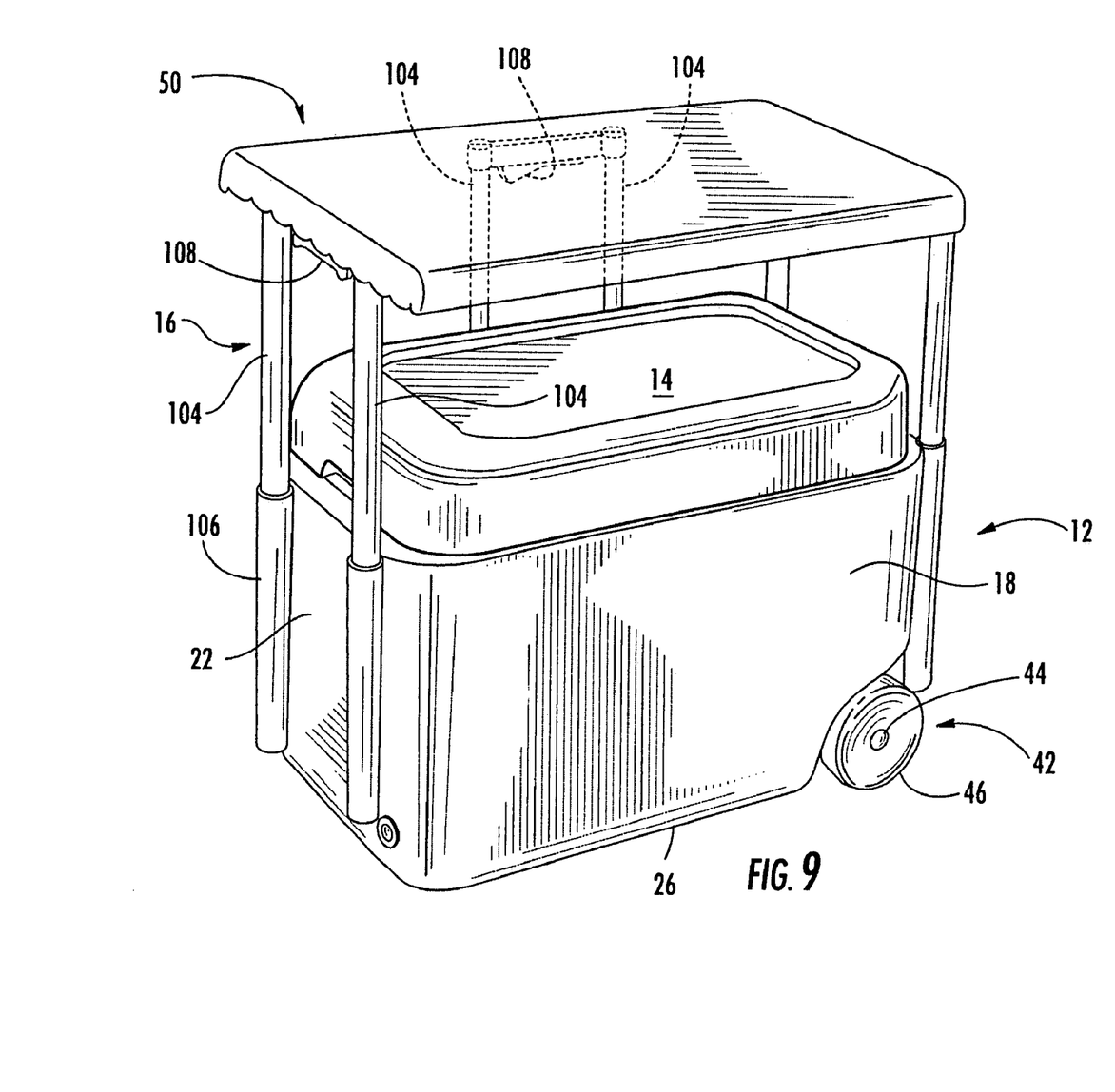
FIG. 9 illustrates an upper perspective view of an alternative embodiment of the container assembly with telescoping arms for selective positioning of the tray and handle members above the surface of the container.

In the last embodiment shown in FIG. 9, the support assembly 56 and handle members 16 comprise a pair of telescoping and collapsible tube assemblies that include at least one locking member for releasably securing the tubes of the tube assemblies in an extended or retracted position as commonly found on wheeled luggage (see for instance U.S. Pat. No. 5,522,615 to Kazmark, Jr. et al., which is hereby incorporated by reference in its entirety.) In this embodiment, the handle assembly 16 and the support assembly 56 includes an inner tube member 104 with a lower ends that telescope within an outer member tube member 106 which is attached by any means known in the art to either side of the container endwalls 22, 24.

As well known in the art, the inner tube members 104 also can include a lock button 108 which engages and disengages a projection, such as a detent pin (not shown) housed within the telescoping tubes to releasbly secure the inner telescoping member 104 with respect to the outer telescoping member 106, such that the height may be easily adjusted in a telescopic fashion until the desired elevation is reached.

The tubes 104, 106 can be made from any suitable material of high strength and rigidly, such as, metal, plastic or suitable combinations thereof.

In another embodiment (not shown) the telescoping members can include apertures formed within both the inner and outer tube members such that an adjustment pin can be inserted through the apertures and affixes the position of the inner tube with respect to the outer tube, this way the height of the table and/or handles over the access opening 28 of the container may be adjusted as desired.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The various apparatus, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable, insulated container comprising in combination:

(a) an container having two opposing sidewall panels and two opposing end panels extending between said sidewall panels, each of said end panels and said sidewall panels are integrally formed to a bottom panel, thereby defining an internal cavity with an upper access opening, said interior cavity being constructed and arranged for receipt of at least one item therein;

(b) a cover member constructed and arranged for positioning between;
(i) a closed position, wherein said cover is placed over said upper access opening;
(ii) an open position, wherein said cover provides access to said interior cavity of said container;

(c) a pair of handle members, each of said handle members comprising at least one leg portion and a transverse portion attached to said leg portion, said leg portion of each handle member is movably attached to said container, each of said handle members includes at least one integrally formed attachment means, wherein said handle members are movably attached between;
  (i) a first position juxtaposed to said container for storage or transport by the user;
  (ii) a second position wherein said at least one attachment means is constructed and arranged to removably attach to and support a tray member;
(d) said tray member including an upper surface, a lower surface, at least one tray member edge, whereby said tray member is attached to said container for movement between;
  (i) a stowed position, wherein said tray member is lower than said upper access opening on one of said sidewall panels of said container;
  (ii) a deployed position wherein said upper surface of said tray member faces upwards and said at least one tray member edge removably engages said handle attachment means, wherein said tray member is laterally stabilized and remains substantially parallel to the surface of said bottom panel; and
wherein said cover member is movable between an open and closed position independent of the location of said tray member.

2. The storage container as set forth in claim 1, wherein said tray member is attached to said container by way of a support assembly.

3. The storage container as set forth in claim 2, wherein said support assembly includes at least one rigid member operatively connected to both said tray member and said container, by at least one pivot means constructed and arranged to pivot said tray member between said stowed and said deployed position as desired.

4. The storage container as set forth in claim 2, wherein said support assembly includes at least one rigid member constructed and arranged to slide within a corresponding channel formed within said container so as to translate said tray member between said stowed and said deployed position as desired.

5. The storage container as set forth in claim 4, wherein said rigid member includes a pin assembly constructed and arranged to slide within said channel.

6. The storage container as set forth in claim 5, wherein said channel includes at least one locking channel located at various heights above said bottom panel, whereby the user can slide said pin assembly into said locking channel once the desired height of said tray member is reached.

7. The storage container as set forth in claim 2, wherein support assembly further comprises an upper and lower telescoping member, said lower telescoping member being attached to said container and said upper telescoping member constructed and arranged to be slidably received within said lower telescoping member to position said tray member between said stowed and said deployed position.

8. The storage container as set forth in claim 7, wherein said at least one leg portion of said handle members further comprises an upper and lower telescoping member, said upper telescoping member constructed and arranged to be slidably received within said lower telescoping member, said lower telescoping member being connected to said end panel, wherein said upper telescoping member slides between said first position and said second position, wherein in said second position will removably attach to and support said tray member.

9. The storage container as set forth in claim 7, wherein said support assembly includes a locking means to lock said support assembly at various predetermined heights above said upper access opening thereby allowing the user to adjust said tray member to a comfortable height.

10. The storage container as set forth in claim 8, wherein said handle members include a locking means to lock said handle members at various predetermined heights above said upper access opening thereby allowing the user to adjust said transverse portion to a comfortable height for towing when in said first position or for accessing items on said upper support surface when in said second position.

11. The storage container as set forth in claim 1, wherein the lower ends of said at least one leg portion of said handle members is pivotally attached to said container by at least one hinge.

12. The storage container as set forth in claim 1, wherein at least one wheel assembly is attached proximate to the junction of said bottom panel and said end wall panel of said container.

13. The storage container as set forth in claim 1, wherein said at least one leg portion of said handle members further comprises an upper and lower telescoping member, said upper telescoping member constructed and arranged to be slidably received within said lower telescoping member, said lower telescoping member being connected to said end panel, wherein said upper telescoping member slides between said first position and said second position.

14. The container as set forth in claim 1, wherein said tray includes upward projecting edges proximate the peripheral edge of said tray to preclude items placed thereupon from rolling off said peripheral edge.

15. The container as set forth in claim 1, wherein said tray includes a plurality of openings formed therein to hold a beverage or the like.

16. The container as set forth in claim 1, wherein said tray member further comprises at least one auxiliary tray surface operatively coupled to said tray member, wherein said auxiliary tray may be extended from a stowed position to an open position, thereby providing additional useable surface area.

* * * * *